(No Model.)

A. L. KNOBLAUGH.
VEHICLE BODY AND SEAT.

No. 595,394. Patented Dec. 14, 1897.

WITNESSES
Emma Lyford
D. S. Oliver

INVENTOR
Augustus L. Knoblaugh
By Geo. Murray Atty.

UNITED STATES PATENT OFFICE.

AUGUSTUS L. KNOBLAUGH, OF CINCINNATI, OHIO.

VEHICLE BODY AND SEAT.

SPECIFICATION forming part of Letters Patent No. 595,394, dated December 14, 1897.

Application filed February 10, 1896. Serial No. 578,683. (No model.)

*To all whom it may concern:*

Be it known that I, AUGUSTUS L. KNOB-LAUGH, a citizen of the United States, and a resident of Cincinnati, in the county of Hamilton and State of Ohio, have invented certain new and useful Improvements in Vehicle Bodies and Seats, of which the following is a specification.

The object of my invention is to provide a front seat for two-seat vehicles which may be readily swung out of its normal position to afford easy access to the rear seat, and also in connection therewith a swinging foot-board which may be thrown up when the seat is to be used with a cut-under or short-turn body.

It also consists in means whereby the foot-board may be automatically thrown down when the half-seat is thrown out of position to provide convenient means for entering the rear of the vehicle and to be automatically swung up when the half-seat is turned to its normal position to permit the free turning of the wheel under the body.

The invention will be first fully described in connection with the accompanying drawings, and then particularly referred to and pointed out in the claims.

Figure 1:
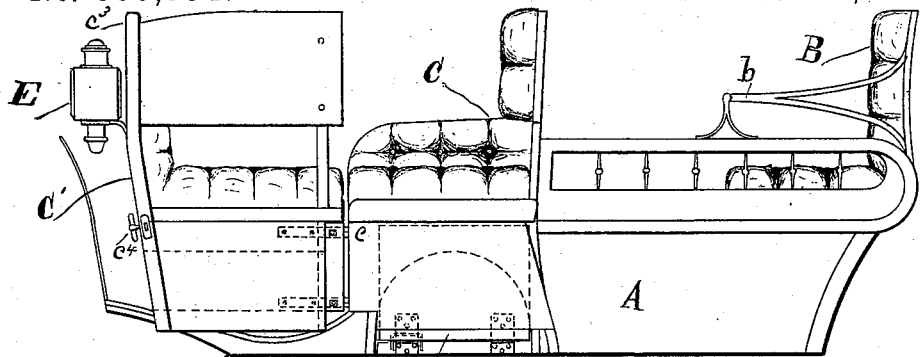
Figure 2:
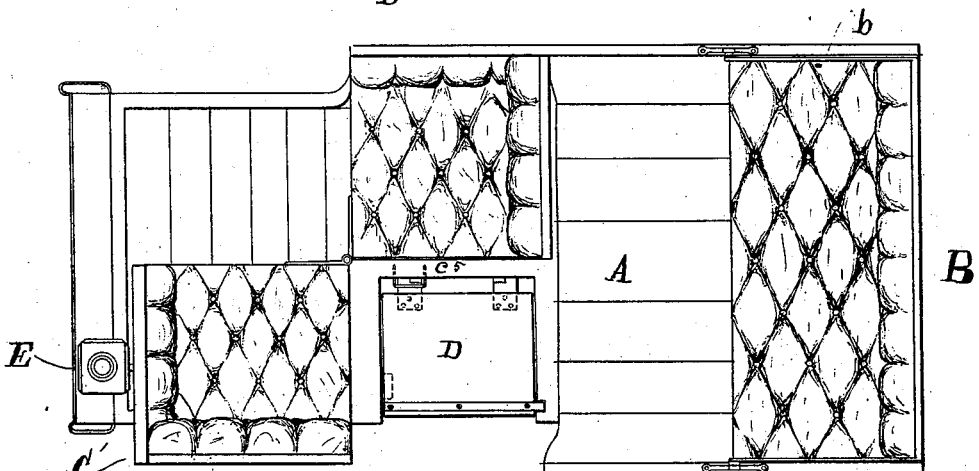
Figure 3:
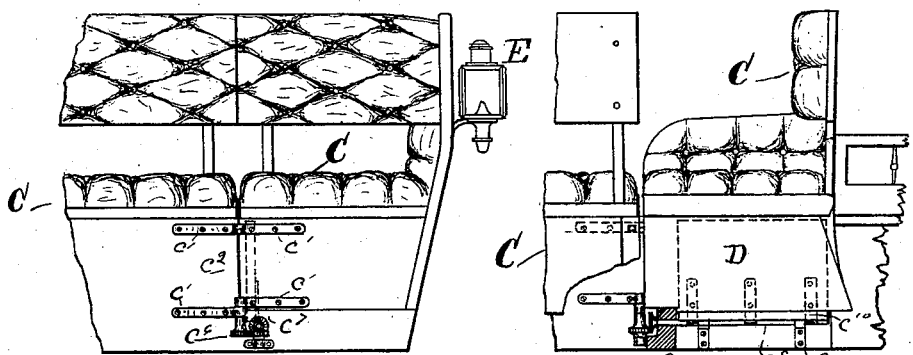
Figure 4:
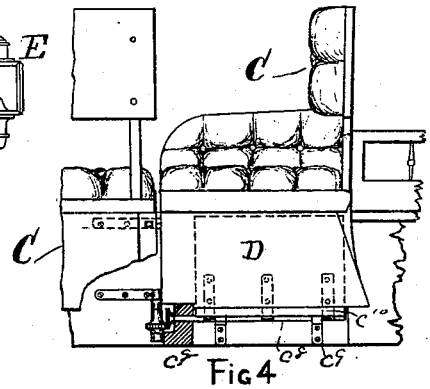

Referring to the drawings, in which like parts are indicated by similar reference-letters wherever they occur throughout the various views, Figure 1 is a side elevation of a well-known undercut-trap body with the half-seat swung around at right angles to the opposite half and the foot-board dropped to afford easy access to the rear seat. Fig. 2 is a top or plan view of the same. Fig. 3 is a front elevation of the front seat thrown to its normal position, illustrating the means to automatically throw the foot-board up against the rigid side of the front seat when the swinging half of the seat is brought to its normal position. Fig. 4 is a detailed view, in longitudinal sectional elevation, of the front part of the body with the swinging half-seat swung forward to permit access to the rear seat, showing the means by which the foot-board is thrown down for convenience of the passengers entering the rear of the vehicle, with the foot-board in its normal position shown in dotted lines.

Referring to the parts, A represents the body of a well-known cut-under trap. The rear-seat back B may be permanently fixed or swung upon arms $b$, as shown, so that the seat may be jumped over against the back of the front seat and the tail-board thrown down to change the trap into a dos-à-dos, as shown in the joint application made by myself and Franklyn H. Knoblaugh.

Half of the front seat C is rigidly fixed in the body A in any suitable manner and has an end partition $c$ preferably extending down to the central rib of the vehicle-body. The other half of the seat C' is constructed similar to the half-seat C and is hinged at its forward inner edge by strap-hinges $c'$ and a vertical pintle-rod $c^2$ to the inner forward edge of the fixed seat C. The outer side wall of the swinging seat $c^3$ is provided with a lock or catch $c^4$, which when the seat is swung around to its normal position locks with the rear body of the frame in a well-known manner like the lock of a carriage-door and holds the swinging half-seat in line with the fixed half-seat, as shown in Fig. 3.

The foot-board D, as seen in Figs. 1 and 2, is hinged at its inner edge to the lower edge of the vertical wall of the fixed seat C. The hinge connection may be by either the well-known spring-hinges or by the ordinary strap-hinge; but if the latter is used a spring $c^5$, of U-shaped form, as seen in Fig. 2, has its legs secured in the vertical side wall of the permanent seat and its lower end extending under the foot-board or one of its hinges, the pressure of the spring being exerted to normally throw the foot-board down when the swinging seat is thrown forward, as seen in Fig. 2. When the seat is to be closed, the foot-board D is thrown up against the end wall of the fixed seat, as shown in dotted line, Fig. 1, to permit the swinging half-seat C' to be thrown in line with the fixed half-seat C. In these views, Figs. 1 and 2, the foot-board is automatically thrown down when the swinging seat C' is thrown forward to permit the passengers to enter the rear of the vehicle, so that there would be no danger of the passenger missing his footing or stepping into space; but after the rear seats are occupied it is necessary to throw the foot-board up by hand before the front seat is swung back to its normal position; but in Figs. 3 and 4 I have shown means by which the foot-board may be automatically thrown up when the half-seat is brought to its normal position and automatically thrown down when the swinging half-seat is swung in front of the vehicle. I will describe this construction. The pintle $c^2$ is extended below the strap-hinge $c'$, and upon its lower end is fixed a bevel-pinion $c^6$, which meshes with a similar bevel-pinion $c^7$, which is secured upon the end of the shaft $c^8$, which is journaled in strap-bearings $c^9$, secured upon the central body-timber. Upon this shaft are secured straps $c^{10}$, which are secured underneath the foot-board D. In this construction the straps $c'$ are rigidly secured to the pintle $c^2$, so that when the swinging half-seat is thrown forward the pintle $c^2$ is revolved, revolving the bevel-pinion $c^6$, and of course the pinion $c^7$, which throws the foot-board D down. The reverse movement of the seat revolves the shaft $c^8$ in the opposite direction and throws the foot-board up to the position shown in dotted line, Fig. 4. The lamps E, which are usually secured to the sides of the front seat upon opposite sides of the vehicle, (in this case I have only shown them secured to the swinging half-seat,) therefore retain their vertical position and are not disturbed by swinging the seat around to permit the passengers to enter, as they would be were the whole front seat, as commonly used in this kind of a trap, swung forward on a horizontal pivot to permit the passengers to enter the rear of the vehicle.

I have described my invention as applied to a short-turn or cut-under vehicle, and in such case it is of course necessary to have the foot-board swing up to permit the wheel to pass under the body when the vehicle is turned; but the swinging seat is also applicable to a straight-bottom body, and in such case no swinging foot-board is required.

I have shown the common hinges for coupling my half-seat and foot-board; but many well-known forms of hinges may be employed without varying the principle of my invention.

What I claim is—

1. In a two-seat vehicle, the combination of the undercut body, the fixed half of the front seat secured therein, the swinging half-seat pivotally connected at its front edge to the fixed half-seat, and the hinged foot-board adapted to be thrown down when the swinging seat is thrown in front of the rigid half-seat to afford easy access to the rear seat of the vehicle, and to be thrown to the vertical position against the inner end of the rigid seat and retained in its vertical position by the swinging seat when brought to its normal position, to permit the wheel to turn under the body, substantially as shown and described.

2. The combination, in an undercut vehicle-body, of the fixed half of the front seat, the swinging half-seat hinged to the front edge thereof, the pintle or journal of said hinge extending below the hinge-straps and the straps upon the swinging half secured to the pintle, a bevel-pinion upon the lower end of said pintle, a longitudinal shaft journaled in bearings secured to the body, a pinion secured upon the forward end of said shaft to mesh with the pinion upon the hinge-pintle, and straps fixed upon said longitudinal shaft the arms of which are secured to the folding foot-board, and the folding foot-board adapted to be turned to the vertical position when the swinging seat is brought to its normal position, and thrown to the horizontal position when the swinging seat is thrown to the front of the carriage to permit of easy access to the rear of the carriage, substantially as shown and described.

AUGUSTUS L. KNOBLAUGH.

Witnesses:
   GEO. J. MURRAY,
   EMMA LYFORD.